Nov. 25, 1952         J. F. GHERBAZ         2,619,029

CHEESE MOLD

Filed June 2, 1949

INVENTOR.
JOSEPH F. GHERBAZ
BY
John W. Michael

Patented Nov. 25, 1952

2,619,029

UNITED STATES PATENT OFFICE 2,619,029

CHEESE MOLD

Joseph F. Gherbaz, Fond du Lac, Wis., assignor to Concord Cheese Corporation, Fond du Lac, Wis., a corporation of Wisconsin Application June 2, 1949, Serial No. 96,743

3 Claims. (Cl. 100—240)

This invention relates to improvements in molds for making cheese.

In the process of making some types of cheese the curd is placed in a mold and put under pressure in a press to extract part of the whey and give the cheese a desired shape. However, the shapes which can be imparted to the cheese are limited because of the practical necessity of moving parts of the mold relative to each other during the pressing.

It is an object of this invention, therefore, to provide a mold for cheese which will impart to the surface of the cheese a symmetrical shape which includes a spheroidal portion and which will permit contraction of the mold during pressing.

Another object of the invention is to provide a cheese mold which has a long useful life under conventional conditions and which is readily and inexpensively manufactured.

These objects are obtained by making the bottom and cover members of the mold of spun sheet steel suitably tinned after forming. The inner surfaces of both members are symmetrically shaped and have spheroidal areas generated by the revolution of a plane curve about an axis in its plane but not cutting it. The bottom member is provided with a cylindrically shaped area outwardly offset from the spheroidal area. The top member has a peripheral flange at the lower boundary of the spheroidal area thereof which slidably fits within said cylindrical area. This guides the respective spheroidal areas of such members so that such areas remain symmetrically alined as the cover telescopes within the bottom. By regulating the initial volume of curd placed in the mold and the duration and pressure of the press, a shape may be obtained for the pressed curd which has a distinctive encircling band located between the upper and lower spheroidal areas. It is desirable for speed and ease of use to provide a flared out lip for said cylindrical area to guide the cover member as it is placed on the bottom member. A mold thus constructed will collapse sufficiently to press the curd and yet it will impart a shape to the curd which includes a side sloping inwardly from the central area thereof toward the ends thereof.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1:
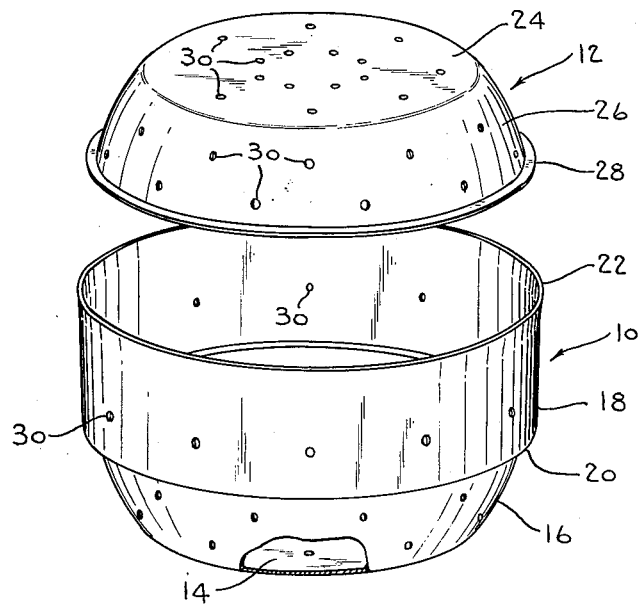
Fig. 1 is a perspective view of a cheese mold embodying the invention, with the cover member removed from the bottom member.
Figure 2:
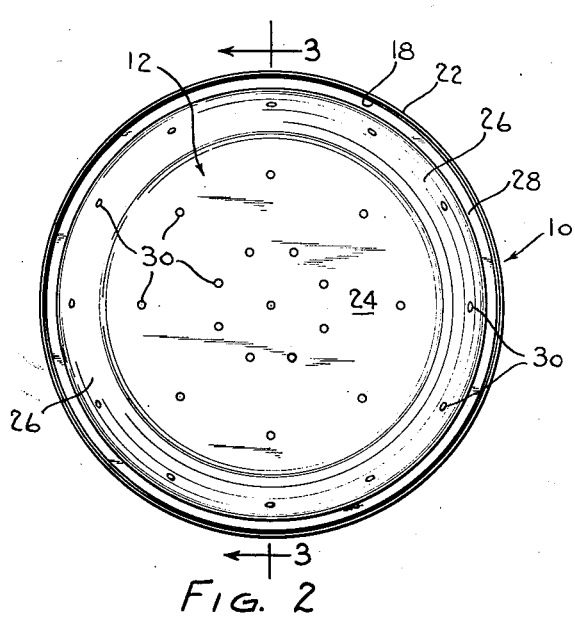
Fig. 2 is a top plan view of the mold viewed in Fig. 1 after a curd has been placed therein and pressed.
Figure 3:
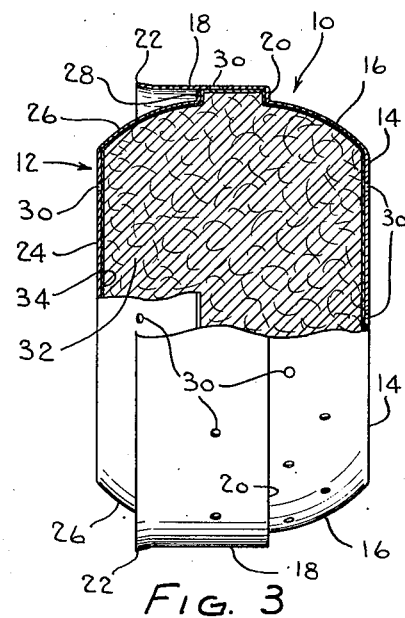
Fig. 3 is a view in side elevation of the mold viewed in Fig. 2 with part being shown in section on line 3—3 of Fig. 2.

Referring to the drawing by reference numerals, the mold comprises a bottom member 10 and a top member 12 designed to telescopically interfit so that a curd placed therein may be pressed to extract the whey. The members are made by spinning sheet steel into the desired shape and thereafter suitably tinning the steel to make it inert in its reaction to the chemicals present in the making of cheese, thus increasing its life and preventing contamination of the food product. The lower member 10 has a lower flat area 14 of circular outline. A spheroidal area 16 connects with the flat area 14 and is generated by revolving a plane curve of the shape shown in Fig. 3 about the axis of the lower member. The spheroidal area 16 is joined by a shoulder 20 to a cylindrical area 18. This latter area extends upwardly from the shoulder 18 and terminates in an outwardly flared lip 22. The top member 12, like the lower member 10, has a flat upper area 24. This area is connected with a spheroidal area 26 generated in the same way as the spheroidal area 16. The open end of the spheroidal area 26 terminates in a peripheral flange 28. The outer diameter of the peripheral flange 28 is slightly less than the inner diameter of the cylindrical area 22; the width of such flange being substantially the same as the width of the shoulder 20. The flange 28 is thus slidably fittable within and guided by the cylindrical area 18, being led to entry therein by the flared lip 22. When so guided the spheroidal area 26 is in symmetrical alinement with the spheroidal area 16 during all positions of the top member 12 as it is moved relatively to the bottom member 10 during the pressing of the curd. Both of the members are provided with a plurality of openings 30 which permit the whey expressed from the curd to be drained from the mold as the members are compressed.

In the use of the device, a high temperature curd 32 folded in a cheese-cloth 34 is placed in the lower member 10 and the edges of the cloth folded over the top of the whey. The top member 12 is then placed on the lower member 10 so that it rests upon the curd. The amount of curd is determined by weight in the conventional manner and sufficient curd is placed in the mold so that when the pressing of the curd is completed the top member 12 will assume the position relative to the bottom member 10 shown in Fig. 3. The pressure may be applied to the single mold or to a series of similarly loaded molds until approximately twenty or twenty-five per cent of the whey has been expressed. During the application of pressure, which is applied to the top and bottom members, the top member moves toward the bottom member, such movement being guided by the slidable interfit between the flange 28 and the inner surface of the cylindrical area 18. This keeps the upper end of the spheroidal area 16 in alinement with the lower end of spheroidal area 26, thus making a pressed curd or cheese which has symmetrically arranged spheroidal areas joined by an encircling band.

With some types of cheese made in such mold it is preferable to press the cheese for approximately fifteen minutes, then remove the cheese from the mold, take off the cheese-cloth, turn the pressed cheese over, and refold the cloth. This brings the folded ends of the cloth against the end of the cheese opposite to that on which they were originally folded. The cheese is then replaced in the mold and again pressed. This shifting of the cheese-cloth eliminates to a large extent the markings made in the end of the cheese by the folded cheese-cloth. It is also advantageous to remove the cheese from the mold after the desired amount of whey has been expressed therefrom, remove the cheese-cloth, insert a circular bandage-like pad in the bottom of the lower member, and then repress the cheese without any cheese-cloth thereon. During all of these operations the members of the mold are relatively guided to each other so that the sloping side areas are kept in proper alinement while still permitting sufficient relative movement between such top and bottom members to compress the cheese the desired amount.

Although only one embodiment of the invention is shown and described herein, it will be understood that this application is intended to cover such changes or modifications as come within the spirit of the invention or scope of the following claims.

I claim:
1. A cheese mold for forming a cheese with symmetrically arranged spheroidal surface areas comprising: a bottom member having an inner surface characterized by a lower flat area, a spheroidal area connected with said flat area, and an extended cylindrical area offset outwardly from and connected with said spheroidal area by an annular shoulder portion; and a top member having an inner surface characterized by an upper flat area, and a spheroidal area connected with said upper flat area; said top member having a rigid, outwardly projecting peripheral flange slidably fittable within said cylindrical area to guide said spheroidal surfaces in symmetrical coaxial alinement as said top member is moved toward said bottom member to provide a centrally disposed, cylindrical band around the cheese coaxially of the spheroidal portions thereof between said peripheral flange and said annular shoulder portion.

2. A cheese mold for forming a cheese which has an outer surface tapering in opposite directions from an enlarged central area thereof to smaller ends thereof, comprising a pair of mold members the inner surfaces of which are characterized by areas which taper outwardly from the closed ends of such members to the open ends thereof; one of said members at the open end thereof having an extended outwardly offset area paralleling an axis of said member and an annular shoulder portion connecting the offset area with the open end of said one member, the other of said members at the open end thereof having a rigid, annular, outwardly-projecting flange adapted to slidably fit within said offset area of the other member to guide said members and maintain said areas in symmetrical coaxial alinement as said members move relative to each other during the pressing of a curd in said mold to provide a centrally disposed, cylindrical band around the cheese coaxially of said tapered portions between said flange and said annular shoulder portion.

3. A cheese mold for forming cheese with spheroidally shaped end portions joined symmetrically by an intermediate cylindrical portion comprising a first mold part having a generally flat end portion, an intermediate spheroidal portion connected to the flat end portion, and an extended cylindrical portion of greater diameter than the spheroidal portion coaxially disposed with respect thereto and connected thereto by an annular wall portion disposed transversely to the axis of said spheroidal portion; a second mold part having a flat end portion and a spheroidal portion connected thereto, said spheroidal portion of the second mold part being provided with an outwardly projecting peripheral flange at the end thereof remote from said flat end portion, said flange being dimensioned to fit telescopically within the cylindrical portion of the first mold part when the two mold parts are coaxially assembled to guide said mold parts axially as they are moved together, the flat end portions of the respective mold parts being disposed in substantially parallel planes disposed substantially perpendicularly to the respective axes of the mold parts, to provide a centrally disposed cylindrical band around the cheese coaxially of said spheroidal portions between said peripheral flange and said wall portion.

JOSEPH F. GHERBAZ.

REFERENCES CITED

The following references are of record in the file of this patent:

UNITED STATES PATENTS

| Number | Name | Date |
|---|---|---|
| 34,241 | Codding | Jan. 28, 1862 |
| 544,508 | Jones | Aug. 13, 1895 |
| 1,031,532 | Damrow | July 2, 1912 |
| 1,049,688 | Eggers | Jan. 7, 1913 |
| 1,469,251 | Damrow | Oct. 2, 1923 |
| 2,266,336 | Royer | Dec. 16, 1941 |
| 2,394,921 | Lehner | Feb. 12, 1946 |